United States Patent [19]

Yoshino et al.

[11] Patent Number: 5,100,437
[45] Date of Patent: Mar. 31, 1992

[54] METHOD OF PRODUCING A NEGATIVE ELECTRODE FOR A SECONDARY BATTERY

[75] Inventors: Masaki Yoshino, Yokohama; Toshiyuki Ohsawa, Kawasaki; Toshiyuki Kabata, Yokohama; Okitoshi Kimura, Tokyo, all of Japan

[73] Assignee: Ricoh Comany, Ltd., Tokyo, Japan

[21] Appl. No.: 745,281

[22] Filed: Aug. 14, 1991

Related U.S. Application Data

[62] Division of Ser. No. 587,864, Sep. 25, 1990.

[30] Foreign Application Priority Data

Sep. 25, 1989 [JP] Japan .................................. 1-246344
Dec. 12, 1989 [JP] Japan .................................. 1-320605
Jul. 25, 1990 [JP] Japan .................................. 2-194852

[51] Int. Cl.$^5$ ............................................. H01M 4/04
[52] U.S. Cl. .................................. 29/623.5; 427/383.9
[58] Field of Search ................... 29/623.5; 427/383.9, 427/372.2; 148/240, 275

[56] References Cited

U.S. PATENT DOCUMENTS

4,956,026  9/1990  Bell .............................. 427/383.9 X
4,973,393  11/1990  Mino et al. .................. 427/383.9 X Primary Examiner—Anthony Skapars
Attorney, Agent, or Firm—Oblon, Spivak, McClelland, Maier & Neustadt

[57] ABSTRACT

A negative electrode for a secondary battery comprises a substrate consisting of aluminum or an aluminum composition comprising aluminum as the main component, the aluminum being in the form of crystals with (100) planes oriented perpendicularly to the surface of the substrate, and a lithium-alumin alloy layer formed thereon, and a method of producing the negative electrode is disclosed.

2 Claims, No Drawings

METHOD OF PRODUCING A NEGATIVE ELECTRODE FOR A SECONDARY BATTERY

This is a division of application Ser. No. 07/587,864, filed on Sept. 25, 1990.

BACKGROUND OF THE INVENTION

1. Field of the Invention

This invention relates to a negative electrode for use in a secondary battery, and more particularly to a negative electrode for use in a secondary battery, which comprises an aluminum substrate comprising aluminum as the main component in the form of crystals with (100) planes oriented in the direction perpendicular to the surface of the substrate and a lithium-aluminum alloy layer formed thereon.

2. Discussion of Background

Recently, a lithium secondary battery has been widely used as a high energy density battery which can be charged and discharged. In the case where metal lithium is used as an active material for a negative electrode of the lithium secondary battery, a dendrite is formed or a deactivated mossy lithium is separated out on the electrode when the battery is charged and discharged. In order to solve this problem, studies have been made on a composition of an electrolyte, and using a lithium alloy as the negative electrode has also been proposed.

Elements which can be alloyed with lithium are aluminum, silicon, tin, magnesium, zinc and lead. Of these elements, aluminum is commonly used because it can readily react with lithium to form an alloy. The resulting Li-Al alloy has the advantages of high occlusion of lithium ions and of light weight.

However, metallurgically prepared Li-Al alloys do not have self-retentivity and cannot occlude lithium ions. Moreover, a large-scaled plant is needed to metallurgically produce Li-Al alloys. Therefore, Li-Al alloys prepared by the following methods have been used as a negative electrode:

(1) A method of electrolytically depositing lithium on an aluminum plate in a non-aqueous electrolyte containing a lithium salt;

(2) A method of laminating a lithium foil on an aluminum plate in an electrolyte and then subjecting the composite to an electrochemical treatment to form a Li-Al alloy; and (3) A method of bringing a lithium foil into contact with an aluminum plate through an electrolyte.

The conventional Li-Al alloys prepared by the above methods, however, are still inadequate as a negative electrode of a secondary battery. This is because 10 mmA/cm$^2$ or more of large electric current cannot be effectively obtained from a positive electrode when the conventional Li-Al alloy is used as a negative electrode. Moreover, the conventional Li-Al alloy cannot endure repeated charging and discharging unless it is formed into a considerably thick layer.

Furthermore, in the case of a laminate of the above-described Li-Al alloy layer and an aluminum plate, the Li-Al alloy easily exfoliates from the aluminum plate due to the brittleness of the alloy, and the aluminum plate tends to be corroded when subjected to a repeated cycle of charging and discharging.

Thus, there has been no Li-Al alloy layer which can sufficiently occlude lithium contained in an electrolyte and can fulfill the requirements for a negative electrode of a secondary battery.

SUMMARY OF THE INVENTION

Accordingly, an object of the present invention is to provide a negative electrode for a secondary battery, which has a high energy density and is excellent in the charging and discharging properties.

The above object of the invention can be attained by a negative electrode for a secondary battery comprising (i) a substrate comprising aluminum, or an aluminum composition comprising aluminum as the main component and at least one element selected from the group consisting of Mg, Mn, Zn and Pb, and (ii) an alloy layer formed thereon, comprising an alloy of lithium and aluminum, or an alloy of lithium, aluminum and at least one element selected from the group consisting of Mg, Mn, Zn and Pb, the substrate comprising as the main component aluminum in the form of crystals with (100) planes oriented in the direction perpendicular to the surface of the substrate.

DETAILED DESCRIPTION OF THE PREFERRED EMBODIMENTS

In the present invention, a plate of aluminum, or of a composition comprising aluminum as the main component in the form of crystals with (100) planes oriented in the direction perpendicular to the surface of the plate and at least one element selected from the group consisting of Mg, Mn, Zn and Pb (hereinafter referred to simply as the aluminum plate or foil) is used for preparing a negative electrode. Because of the use of such an aluminum plate, a layer comprising an alloy of lithium and aluminum or of lithium, aluminum and at least one element selected from the group consisting of Mg, Mn, Zn and Pb can be formed on the aluminum plate or foil with a uniform thickness, which has self-retentivity and the properties of a $\beta$-layer with the ratio of Li to Al being substantially 1 : 1.

In the case where the negative electrode of the present invention is used for a spiral-type battery or a paper battery, the electrode is required to have not only excellent charging and discharging properties, but also high flexibility even when the electrode contains an alloy layer with a thickness in the range of 35-60 $\mu$m.

The negative electrode of the present invention can be prepared, for example, by superimposing at least one element elected from the group consisting of Mg, Mn, Zn and Pb on a layer of aluminum, and alloying the element superimposed, the Al of the substrate and Li, or by laminating a foil comprising lithium as the main component on a plate comprising as the main component aluminum in the form of crystals with the (100) planes, followed by subjecting the laminated composite to an alloying process. Thus, an alloy layer comprising at least lithium and aluminum is formed on the upper part of the aluminum plate with the lower part thereof remaining non-alloyed. In the present invention, the non-alloyed portion of the aluminum plate corresponds to the substrate of the negative electrode.

In the present invention, it is preferable that the plate comprise as the main component aluminum in the form of crystals with (100) planes perpendicular to the surface of the plate with a ratio of 50% or more throughout the plate when measured by X-ray diffractiometry.

The above aluminum plate may further comprise at least one element of Mg, Mn, Zn or Pb. The amount of such an element(s) is 0.01-2 atom%. The above elements can be incorporated into the aluminum plate by an electrochemical method and a vacuum-deposition method. Alternatively, a metallurgically prepared aluminum alloy containing Mn or Mg, that is, an aluminum alloy of a 3000 system or a 5000 system, can be used.

A layer comprising lithium as the main component may be a lithium layer consisting of lithium, or of an alloy or mixture of metals comprising 80 atom% or more of lithium, such as Li-Al, Li-Si, Li-Sn, Li-Al-Mg or Li-Na-Pb. This alloy layer may further comprise at least one of Mg, Mn, Zn and Pb in an amount of 0.01 to 15 atm%, preferably in amount in the range of 0.05 to 10 atm%, of the alloy layer.

Instead of laminating the above lithium foil on the aluminum plate, a lithium layer can be formed on the aluminum plate by means of vacuum deposition. In this case, a metal having a low melting point, comprising lithium is vacuum-deposited on the aluminum plate.

Since the aluminum plate comprises aluminum crystals with (100) planes oriented in the direction perpendicular to the surface thereof, aluminum can be alloyed with lithium by application of heat. The previously-mentioned methods (1)-(3) can be employed to alloy aluminum with lithium. However, the above heating method is advantageous over the methods (1)-(3) because a Li-Al alloy can be obtained for a short reaction time at a low production cost when the heating method is employed.

In the heating method, the aluminum plate or the lithium layer formed thereon is heated to a temperature in the range of 45°-200° C., preferably 60°-100° C., for approximately 5-90 seconds.

The Li-Al alloy obtained by the heating method or one of the methods (1)-(3) exhibits a potential in the range of 0.35-0.39 V to a standard electrode of lithium. From this potential range, it can be confirmed that the Li-Al alloy contains lithium and aluminum in the ratio of approximately 1:1 and therefore has the characteristics of a $\beta$-layer.

It is inadequate to produce a sheet-shaped negative electrode by the lamination method. This is because the alloy layer formed by the lamination method is inevitably thick, so that the formed alloy layer is not flexible. It is therefore preferable to prepare a sheet-shaped negative electrode by heating an aluminum sheet on which lithium is deposited in vacuum, or by applying a direct or alternating current to the aluminum sheet in an electrolyte. The previously mentioned method (4) is also employable to prepare a sheet-shaped negative electrode.

In the present invention, it is preferable that the aluminum plate have a rough surface. This is because aluminum and lithium easily react and a large reaction area can be ensured when the surface of the aluminum plate is rough. It is preferable that the rough surface have extremely small pits in such a shape that the concentration of an electric field can be prevented. Namely, it is preferable that the pits be round, have a depth of 1 $\mu$m or more and be repeated with a cycle of 100 $\mu$m or less.

The surface of an aluminum plate can be roughened by mechanical abrasion using an emery paper, an abrasive or an abrading machine, or an electrochemical method such as ion sputtering or electrolytic etching. Of these methods, a blast method and electrolytic etching are preferred because they can be easily performed and are reliable.

It is preferable that the aluminum plate be roughened under an inert atmosphere.

Since the Li-Al alloy covers the rough surface of the aluminum plate, a large contact area between the Li-Al alloy and the aluminum plate can be ensured. Therefore, when the aluminum plate with a rough surface is used for preparing a negative electrode, the current-collecting efficiency of the electrode is enhanced. A battery containing such a negative electrode has a long life span and high reliability.

Instead of roughening, penetrating holes can be provided in the aluminum plate, which are in the shape of a polygon such as a triangle or a tetragon, a circle, an ellipse or a combination thereof.

It is preferable that the penetrating holes be uniform in size and vertical to the surface of the aluminum plate. However, penetration holes inclined at 45° or less are also acceptable.

It is also preferable that the penetrating holes are in the round shape because round holes can prevent the concentration of an electric field.

The diameter of the penetrating hole is approximately 0.5 to 1000 $\mu$m, preferably 1 to 500 $\mu$m, and more preferably 1 to 200 $\mu$m. The proportion of the total surface area of the penetrating holes to the surface area of the aluminum plate is approximately 1 to 70%, preferably 5 to 30%, and more preferably 10 to 27%.

The penetrating holes can be provided in any configurations by a mechanical method such as punching, chemical etching or electrochemical etching.

It is preferable that the thickness of the aluminum substrate be 20 to 200 $\mu$m, preferably 30 to 100 $\mu$m, and the thickness of the Li-Al alloy layer is smaller than that of the aluminum substrate, for instance, in the range of 4 to 150 $\mu$m, preferably 10 to 100 $\mu$m.

A lithium secondary battery can be prepared by using the negative electrode of the present invention, a positive electrode and a non-aqueous liquid electrolyte. A separator and a solid electrolyte may further be employed in the battery, if necessary.

As the non-aqueous liquid electrolyte, a solution prepared by dissolving an electrolytic salt in a non-aqueous solvent is employed. Any electrolytic salts which are usable for the ordinary non-aqueous electrolytic battery can be used as the electrolytic salt. Examples of the electrolytic salt include $LiClO_4$, $LiBF_4$, $LiAsF_6$, $LiPF_6$, $LiSbF_6$, $LiCF_3SO_3$, $CF_3COOLi$, $NaClO_4$, $NaBF_4$, $NaSCN$, $KBF_4$, $(Bu)_4NBF_4$, $(Et)_4NBF_4$, $(Bu)_4NClO_4$, and $(Et)_4NClO_4$. These electrolytic salts can be used either singly or in combination.

Of the above electrolytic salts, $LiClO_4$ and $LiCF_3SO_3$ are preferable. When these electrolytic salts are used in combination with the negative electrode of the present invention, the charging and discharging efficiency of the battery can be extremely improved.

Examples of the non-aqueous solvent include propylene carbonate, $\gamma$-butyl lactone, ethylene carbonate, sulforan, dioxolan, tetrahydrofuran, 2-methyltetrahydrofuran, dimethylsulfoxide, 1,2-dimethoxyethane, 1,2-ethoxyethane, methyldigraim, methyltrigraim, methyltetragraim, ethylgraim, ethyldigraim, and butyldigraim. Of these, the combination use of propylene carbonate, $\gamma$-butyl lactone and/or a graim is preferable when electroconductivity and solubility of the electrolytic salts are taken into consideration. Furthermore, when charging and discharging efficiency is taken into consideration, $\gamma$-butyl lactone is most preferred.

The concentration of the electrolytic salt in the electrolyte is 0.5 to 7 M, preferably 1 to 5 M.

A solid electrolyte can be used instead of a separator or the liquid electrolyte. Examples of an inorganic material usable as the solid electrolyte include metal halide compounds such as AgCl, AgBr, AgI and LiI, and RbAg$_4$I$_3$ and RbAg$_4$I$_4$CN. Examples of an organic material usable as the solid electrolyte are as follows: a composite prepared by dissolving the above-mentioned electrolytic salt in a polymer matrix of polyethylene oxide, polypropylene oxide, polyvinylidene fluoride or polyacrylic amide, a material prepared by cross-linking the above composites, a polymeric electrolyte prepared by grafting an ion dissociation group such as polyethylene oxide having a low molecular weight or crown ether to the main chain of a polymer; and a viscoelastic solid electrolyte prepared by impregnating an electrolytic solution to a polymer. Of these, the viscoelastic solid electrolyte is preferred because it can prevent decay of the negative electrode and exfoliation of the alloy layer from the substrate, and can reduce contact resistance between the negative electrode and the electrolyte.

As an active material for a positive electrode which is used in combination with the negative electrode of the present invention, chalcogenite compounds such as TiS$_2$, Nb$_3$S$_4$, Mo$_3$S$_4$, CoS$_2$, FeS$_2$, V$_2$O$_5$, Cr$_2$O$_5$ and MnO$_2$, inorganic oxides, and electroconductive polymers such as polyaniline, polypyrrole, poly-3-methylthiophene and polydiphenylbenzidine are mentioned.

A polymeric material tends to absorb an electrolytic salt. Therefore, an electrolyte for use with a positive electrode having a polymeric active material is required to contain an excess amount of an electrolytic salt.

There is no limitation to the combination of a positive electrode and an electrolyte. However, it is most preferable to use an electroconductive polymer as the positive electrode, LiCF$_3$SO$_3$ and LiClO$_4$ as the electrolytic salts, and γ-butyl lactone as the solvent.

Other features of this invention will become apparent in the course of the following description of exemplary embodiments, which are given for illustration of the invention and are not intended to be limiting thereof.

PRODUCTION EXAMPLE I-1

An aluminum foil with a thickness of 300 μm, comprising aluminum crystals with (100) planes oriented in the direction perpendicular to the surface thereof with a ratio of 93% measured by X-ray diffractiometry in the aluminum foil, and a lithium foil with a thickness of 100 μm were brought into pressure contact with each other. The resulting laminate was then heated from the aluminum foil side to a temperature of 150° C. for 15 seconds, thereby alloying aluminum with lithium.

Thus, negative electrode A-1 with a thickness of 405 μm according to the present invention, containing a Li-Al alloy layer with a thickness of approximately 120 μm was obtained.

PRODUCTION EXAMPLE I-2

A 50 μm thick lithium foil was brought into contact with an aluminum foil with a thickness of 70 μm, comprising aluminum crystals with (100) planes oriented in the direction perpendicular to the surface thereof with a ratio of 55%, while dropping a solution prepared by dissolving 1 M of LiBF$_4$ in a 7:3 (by volume) mixed solvent of propylene carbonate and dimethoxyethane on the surface of the aluminum foil. The above was continued for approximately 15 minutes, thereby alloying aluminum with lithium.

Thus, negative electrode A-2 with a thickness of 85 μm according to the present invention, containing a Li-Al alloy layer with a thickness of 15 μm was obtained.

PRODUCTION EXAMPLE I-3

Both surfaces of a 70 μm thick aluminum foil, comprising aluminum crystals with (100) planes oriented in the direction perpendicular to the surface thereof with a ratio of 55% measured by X-ray diffractiometry, were vacuum-deposited with lithium to form lithium layers with a thickness of 20 μm each. Thereafter, the lithium layers were heated to a temperature of 160° C. by an infrared ray to alloy aluminum with lithium.

Thus, negative electrode A-3 with a thickness of 98 μm according to the present invention, containing Li-Al alloy layers with a thickness of 22 μm each was obtained.

PRODUCTION EXAMPLE I-4

An aluminum foil with a thickness of 75 μm, comprising aluminum crystals with (100) planes oriented in the direction perpendicular to the surface thereof with a ratio of 68% measured by X-ray diffractiometry, was electrochemically etched to form numerous pits in the vertical direction of the aluminum foil. Both surfaces of the etched aluminum foil were vacuum-deposited with lithium to form lithium layers with a thickness of 20 μm each. Thereafter, the aluminum foil thus treated was heated to a temperature of 140° C. in an oven, thereby alloying aluminum with lithium.

Thus, negative electrode A-4 with a thickness of 102 μm according to the present invention, containing Li-Al alloy layers with a thickness of 25 μm each was obtained.

COMPARATIVE PRODUCTION EXAMPLE I-1

The procedure for Production Example I-1 wa repeated except that the aluminum foil used in Production Example I-1 was replaced by an aluminum sheet with a thickness of 300 μm, from which substantially no aluminum crystals with the (100) planes perpendicular to the surface thereof can be detected by X-ray diffractometry, but which contains (110) planes, whereby comparative negative electrode B-1 was obtained.

COMPARATIVE PRODUCTION EXAMPLE I-2

The procedure for Production Example I-2 was repeated except that the aluminum foil used in Production Example I-2 was replaced by an aluminum sheet with a thickness of 70 μm, from which substantially no aluminum crystals with the (100) planes perpendicular to the surface thereof can be detected by an X-ray diffractometry, but which contains (110) planes, whereby comparative negative electrode B-2 was obtained.

COMPARATIVE PRODUCTION EXAMPLE I-3

The procedure for Production Example I-3 was repeated except that the aluminum foil used in Production Example I-3 was replaced by an aluminum sheet with a thickness of 70 μm, from which substantially no aluminum crystals with the (100) planes perpendicular to the surface thereof can be detected by X-ray diffractiometry, but which contains (110) planes, whereby comparative negative electrode B-3 was obtained.

COMPARATIVE PRODUCTION EXAMPLE I-4

The procedure for Production Example I-4 was repeated except that the aluminum foil used in Production Example I-4 was replaced by an aluminum sheet with a thickness of 75 μm, from which substantially no aluminum crystals with the (100) planes perpendicular to the surface thereof can be detected by X-ray diffractiometry, but which contains (110) planes, whereby comparative negative electrode B-4 was obtained.

The natural electrode potentials of the above-prepared negative electrodes were measured with respect to a negative lithium reference electrode in an electrolyte prepared by dissolving 3 M of $LiBF_4$ in a 7:3 (by volume) mixed solvent of propylene carbonate and dimethoxyethane. The results are shown in the table below.

| Electrode No. | Natural Electrode Potential |
|---|---|
| A-1 | 371 mV |
| A-2 | 380 mV |
| A-3 | 368 mV |
| A-4 | 366 mV |
| B-1 | 380 mV |
| B-2 | 387 mV |
| B-3 | 380 mV |
| B-4 | 395 mV |
| | V vs $Li/Li^+$ |

EXAMPLE I-1

A pellet with a thickness of 0.6 mm and a diameter of 16 mm was made by pressing, under vacuum, 0.1 g of a paste containing 70 wt.% of sinterred electrolytically prepared manganese dioxide, 25 wt.% of acetylene black and 5 wt.% of polytetra-fluoroethylene.

By using the negative electrode A-1, the above-prepared pellet as a positive electrode, a separator (Trademark "Celgard 2500", made by Hoechst Celanese), and an electrolyte prepared by dissolving 1 M of $LiPF_6$ into a 7:3 (by volume) mixed solvent of propylene carbonate and ethoxymethoxyethane, coin-shaped battery No. I-1 (2016 type) comprising the negative electrode according to the present invention was prepared.

EXAMPLE I-2

A polyaniline sheet electrode was prepared by depositing 0.21 g of polyaniline on a stainless steel sheet with a thickness of 20 μm and a size of 40 mm×210 mm by means of electrolytical polymerization.

By using the negative electrode A-2, the above-prepared polyaniline sheet electrode as a positive electrode, a separator (Trademark "Celgard 2500", made by Hoechst Celanese), and a γ-butyl lactone solution containing 3 M of $LiClO_4$ as an electrolyte, spiral-type battery No. I-2 comprising the negative electrode according to the present invention was prepared.

EXAMPLE I-3

The procedure for Example I-2 was repeated except that the negative electrode A-2 used in Example I-2 wa replaced by the negative electrode A-4, and the electrolyte used in Example I-2 was replaced by a γ-butyl lactone solution containing 3 M of $LiCF_3SO_3$, whereby spiral-type battery No. I-3 comprising the negative electrode according to the present invention was prepared.

COMPARATIVE EXAMPLE I-1

The procedure for Example I-1 was repeated except that the negative electrode A-1 used in Example I-1 was replaced by the negative electrode B-1, whereby coin-shaped battery (2016 type) No. I-1' comprising the comparative negative electrode was prepared.

COMPARATIVE EXAMPLE I-2

The procedure for Example I-2 was repeated except that the negative electrode A-2 used in Example I-2 was replaced by the negative electrode B-2, whereby spiral-type battery No. I-2' comprising the comparative negative electrode was prepared.

COMPARATIVE EXAMPLE I-3

The procedure for Example I-3 was repeated except that the negative electrode A-4 used in Example I-3 was replaced by the negative electrode B-4, whereby spiral-type battery No. I-3' comprising the comparative negative electrode was prepared.

EVALUATION

The above-prepared batteries were evaluated by subjecting a repeated cycle of charging and discharging.

The battery No. I-1 according to the present invention and the comparative battery No. I-1' were charged to 3.2 V and discharged to 1.5 V with application of an electric current of 1 mA. The energy capacity of each of the batteries was measured after the 10th, the 100th and the 300th charging and discharging cycle. The results are shown in table below.

The battery No. I-2 according to the present invention and the comparative battery No. I-2' were charged to 3.3 V and discharged to 2.0 V with application of an electric current of 1 mA. The energy capacity of each of the batteries was measured after the 10th, the 100th and the 300th charging and discharging cycle. The results are shown in table below.

The battery No. I-3 according to the present invention and the comparative battery No. I-3' were charged to 3.3 V and discharged to 2.0 V with application of an electric current of 10 mA. The energy capacity of each of the batteries was measured after the 10th, the 100th and the 300th charging and discharging cycle. The results are shown in table below.

| Battery | Open Voltage (V) | Energy Capacity (mAh) | | |
|---|---|---|---|---|
| | | 10th | 100th | 300th |
| No. I-1 | 3.06 | 21 | 19 | 14 |
| No. I-2 | 3.30 | 227 | 183 | 148 |
| No. I-3 | 3.30 | 218 | 193 | 161 |
| No. I-1' | 3.07 | 20 | 5 | 0.05 |
| No. I-2' | 3.28 | 199 | 100 | 0.5 |
| No. I-3' | 3.27 | 208 | 110 | 1.0 |

PRODUCTION EXAMPLE II-1

An aluminum plate with a purity of 99.9% and a thickness of 70 μm, comprising aluminum crystals with (100) planes oriented in the direction perpendicular to the surface thereof with a ratio of 90% measured by X-ray diffractiometry was thoroughly abraded by a #200 emery paper.

Electrolysis was conducted by using the above-abraded aluminum as a negative electrode, a platinum plate as a positive electrode and a propylene carbonate solution containing 1 M of magnesium perchlorate as an electrolyte, whereby Mg was incorporated into the aluminum plate. The applied constant electric current was 1 mA/cm$^2$, and the amount of the applied electricity was 0.3 C/cm$^2$.

A 50 μm thick lithium foil was superposed on both surfaces of the above-obtained aluminum plate containing Mg, while uniformly dropping, on the aluminum plate, a solution prepared by dissolving 1 M of LiBF$_4$ in a 7:3 (by volume) mixed solvent of propylene carbonate and dimethoxyethane. The above was continued for approximately 15 minutes, thereby alloying aluminum with lithium.

Thus, negative electrode C-1 with a thickness of 85 μm according to the present invention, containing Li-Al alloy layers with a thickness of approximately 15 μm each was obtained.

PRODUCTION EXAMPLE II-2

An aluminum foil with a thickness of 75 μm, comprising aluminum crystals with (100) planes oriented in the direction perpendicular to the surface thereof with a ratio of 90%, was provided with numerous pits in the vertical direction to the surface thereof by means of electrochemical etching.

Electrolysis wa conducted by using the above-etched aluminum foil as a negative electrode, a platinum plate as a positive electrode and a propylene carbonate solution containing 1 M of magnesium perchlorate as an electrolyte, whereby Mg was incorporated into the aluminum plate. The applied constant electric current was 1 mA/cm$^2$, and the amount of the applied electricity was 0.2 C/cm$^2$.

Both surfaces of the above-obtained aluminum foil containing Mg were vacuum-deposited with lithium to form lithium layers with a thickness of 20 μm each. The aluminum foil thus treated was heated to a temperature of 140° C. in an oven, thereby alloying aluminum with lithium.

Thus, negative electrode C-2 with a thickness of 102 μm according to the present invention, containing the Li-Al alloy layers with a thickness of approximately 25 μm each, was obtained.

COMPARATIVE PRODUCTION EXAMPLES II-1 TO II-2

The procedures for Production Examples II-1 and II-2 were respectively repeated except that the aluminum plates used in those Production Examples II-1 and II-2 was replaced by an aluminum sheet with a purity of 98% and a thickness of 70 μm, which is substantially free from aluminum crystals with (100) planes oriented in the direction perpendicular to the surface thereof, whereby comparative negative electrodes D-1 and D-2 were obtained.

The natural electrode potentials of the above-prepared negative electrodes were measured with respect to a negative lithium reference electrode in an electrolyte prepared by dissolving 3M of LiBF$_4$ in a 7:3 (by volume) mixed solvent of propylene carbonate and dimethoxyethane. The results are shown in the table below.

| Electrode No. | Natural Electrode Potential |
| --- | --- |
| C-1 | 380 mV |
| C-2 | 366 mV |
| D-1 | 385 mV |

-continued

| Electrode No. | Natural Electrode Potential |
| --- | --- |
| D-2 | 388 mV |

EXAMPLE II-2

A polyaniline sheet electrode for use as a positive electrode was prepared by depositing 0.21 g of polyaniline on a stainless steel sheet with a thickness of 20 μm and a size of 40 mm × 210 mm by means of electrolytic polymerization.

To 80 parts by weight of γ-butyl lactone containing 3 M of LiBF$_4$, 19.2 parts by weight of ethoxydiethylene glycol and 0.8 parts by weight of methylbenzoylformate were added and mixed to prepare an electrolyte.

The positive electrode, the negative electrode C-1 and a separator (Trademark "Celgard 2500", made by Hoechst Celanese) were impregnated with the above-prepared electrolyte, and then an active light was applied thereto by a mercury high-pressure vapor lamp. By using these members, sheet-shaped battery No. II-2 comprising the negative electrode according to the present invention was prepared.

EXAMPLE II-2

The procedure for Example II-1 was repeated except that the negative electrode C-1 used in Example II-2 was replaced by the negative electrode C-2, and the electrolyte used in Example II-2 was replaced by a γ-butyl lactone solution containing 3 M of LiCF$_3$SO$_3$, whereby battery No. II-3 comprising the negative electrode according to the present invention was prepared.

COMPARATIVE EXAMPLES II-1 and II-2

The procedures for Examples II-1 and II-2 were repeated except that the respective negative electrodes employed in Examples II-1 and II-3 were respectively replaced by the comparative negative electrodes prepared in Comparative Production Examples II-1 and II-2, whereby comparative batteries No. II-1' and No. II-2' were prepared.

EVALUATION

The above-prepared batteries were evaluated by subjecting a repeated cycle of charging and discharging.

The battery No. II-1 according to the present invention and the comparative battery No. II-1' were charged up to 3.2 V and discharged down to 2.0 V with application of an electric current of 1 mA. The energy capacity of each of the batteries was measured after the 10th, the 100th and the 300th charging and discharging cycles. The results are shown in table below.

The battery No. II-2 according to the present invention and the comparative battery No. II-2' were charged up to 3.3 V and discharged down to 2.0 V with application of an electric current of 10 mA. The energy capacity of each of the batteries was measured after the 10th, the 100th and the 300th charging and discharging cycles. The results are shown in table below.

| Battery | Open Voltage (V) | Energy Capacity (mAh) | | |
| --- | --- | --- | --- | --- |
| | | 10th | 100th | 300th |
| No. II-1 | 3.30 | 13 | 12 | 10 |
| No. II-2 | 3.30 | 218 | 193 | 169 |
| No. II-1' | 3.28 | 12 | 9.5 | 4.0 |

| Battery | Open Voltage (V) | Energy Capacity (mAh) | | |
| --- | --- | --- | --- | --- |
| | | 10th | 100th | 300th |
| No. II-2' | 3.27 | 208 | 110 | 1.0 |

What is claimed is:

1. A method of producing a negative electrode for a secondary battery comprising (i) a substrate made of aluminum, or a composition comprising aluminum as the main component and at least one element selected from the group consisting of Mg, Mn, Zn and Pb, and (ii) an alloy layer formed thereon, comprising an alloy of lithium and aluminum, or an alloy of lithium, aluminum and at least one element selected from the group consisting of Mg, Mn, Zn and Pb, said substrate comprising crystals with a crystal face of (100) in the vertical direction to the surface of said substrate, comprising the steps of:
    (a) superimposing at least one element selected from the group consisting of Mg, Mn, Zn and Pb on a layer of aluminum, and
    (b) alloying said element superimposed, Al of said substrate and Li.

2. The method of producing a negative electrode for a secondary battery as claimed in claim 1, wherein said alloying is performed by application of heat to said superimposed element, Al of said substrate and Li.

* * * * *